United States Patent [19]

Ducote et al.

[11] Patent Number: 6,152,303
[45] Date of Patent: Nov. 28, 2000

[54] BATTERY STORAGE SYSTEM

[76] Inventors: Robert J. Ducote; Glenda Ducote, both of 2313 Valmar Dr., Meraux, La. 70075

[21] Appl. No.: 09/388,588

[22] Filed: Sep. 2, 1999

[51] Int. Cl.[7] .................................................. B65D 85/00
[52] U.S. Cl. ......................... 206/703; 206/523; 206/446; 220/848; 220/523
[58] Field of Search .................................... 206/701, 703, 206/705, 523, 446, 378, 3; 220/844, 848, 523, 528, 507

[56] References Cited

U.S. PATENT DOCUMENTS

| | | |
|---|---|---|
| 1,467,577 | 9/1923 | Folsom . |
| 4,015,708 | 4/1977 | Kelm . |
| 4,106,597 | 8/1978 | Shook et al. ............................. 206/523 |
| 4,173,286 | 11/1979 | Stanko .................................... 206/523 |
| 4,209,091 | 6/1980 | Lieberman . |
| 4,412,616 | 11/1983 | Williams . |
| 4,971,197 | 11/1990 | Worley . |
| 5,670,268 | 9/1997 | Mancusi .................................. 220/528 |
| 5,823,350 | 10/1998 | Ward . |
| 6,012,576 | 1/2000 | Onodera ................................... 206/446 |

*Primary Examiner*—Paul T. Sewell
*Assistant Examiner*—Nhan T. Lam
*Attorney, Agent, or Firm*—Joseph N. Breaux

[57] ABSTRACT

A two-part hinged carrying case having a first and a second part. First and second molded foam inserts formed from electrically non-conductive resilient foam are positioned, respectively, within the first and second part of the two-part hinged carrying case. The first molded foam insert includes a number of two-part cavities formed therein and open to a first insert surface. Each of the two-part cavities has a first cavity open to the first insert surface having a first diameter less than a diameter of a battery to be inserted therein and a depth greater than one-half a length of the battery to be inserted therein and a second cavity concentrically oriented with the first cavity and in connection with the first cavity. The second cavity has a second diameter at least one-quarter inch less than the first diameter and a depth greater than a positive pole protrusion of the battery to be inserted therein. The first molded foam insert being constructed from a resilient foam of sufficient resilience to allow the walls defining the first cavity to stretch for receiving a battery and resiliently gripping and holding sidewalls of the battery.

1 Claim, 2 Drawing Sheets

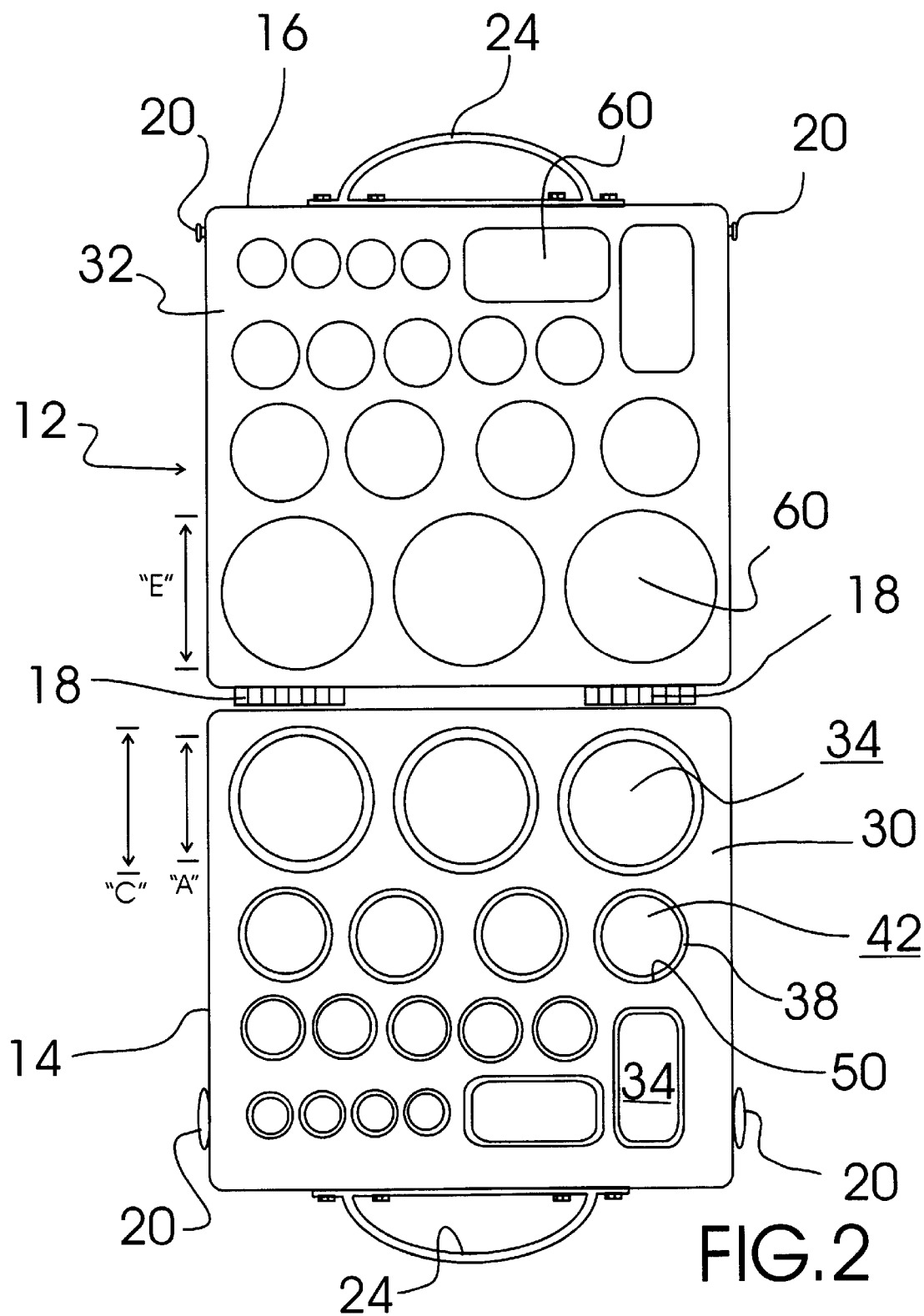

BATTERY STORAGE SYSTEM

TECHNICAL FIELD

The present invention relates to portable storage systems and more particularly to a battery storage system that includes a two-part hinged carrying case having a first and a second part; a first molded foam insert formed from electrically non-conductive resilient foam and positioned within the first part of the two-part hinged carrying case; a second molded foam insert formed from electrically non-conductive resilient foam and positioned within the second part of the two-part hinged carrying case; first and second handle portions secured, respectively, to the first and second parts of the two-part hinged carrying case; two hinge assemblies connected between the first and second two-part hinged carrying case; and two sets of securing hasps secured to the two-part hinged carrying case such that the first and second parts are securable together with the two sets of securing hasps when the first and second parts of the two-part hinged carrying case are folded into a closed configuration; the first molded foam insert including a number of two-part cavities formed therein and open to a first insert surface, each of the two-part cavities having a first cavity open to the first insert surface having a first diameter less than a diameter of a battery to be inserted therein and a depth greater than one-half a length of the battery to be inserted therein and a second cavity concentrically oriented with the first cavity and in connection with the first cavity, the second cavity having a second diameter at least one-quarter inch less than the first diameter and a depth greater than a positive pole protrusion of the battery to be inserted therein, the first molded foam insert being constructed from a resilient foam of sufficient resilience to allow the walls defining the first cavity to stretch for receiving a battery and resiliently gripping and holding sidewalls of the battery; the second molded foam insert having a corresponding number of one-part cavities formed therein wherein one one-part cavity of the second molded foam insert is concentrically oriented with one of the two-part cavities of the first molded foam insert; each of the one-part cavities having a diameter greater than the first diameter of the corresponding two-part cavity and a depth selected to prevent a negative pole of a battery intended to be inserted into the corresponding two-part cavity from contacting a bottom surface of the one-part cavity.

BACKGROUND ART

It is often important to have spare batteries for replacing worn out or drained batteries. Because the batteries can be stored for extended periods of time, it would be desirable to have a device that for holding and organizing replacement batteries that holds the batteries in such a manner that discharge currents are not created which could drain the batteries over an extended period of time. Because the batteries can often be carried from place to place, it would be further desirable to have a storage system that included handles for easily transporting the batteries from place to place.

GENERAL SUMMARY DISCUSSION OF INVENTION

It is thus an object of the invention to provide a battery storage system that includes a two-part hinged carrying case having a first and a second part; a first molded foam insert formed from electrically non-conductive resilient foam and positioned within the first part of the two-part hinged carrying case; a second molded foam insert formed from electrically non-conductive resilient foam and positioned within the second part of the two-part hinged carrying case; first and second handle portions secured, respectively, to the first and second parts of the two-part hinged carrying case; two hinge assemblies connected between the first and second two-part hinged carrying case; and two sets of securing hasps secured to the two-part hinged carrying case such that the first and second parts are securable together with the two sets of securing hasps when the first and second parts of the two-part hinged carrying case are folded into a closed configuration; the first molded foam insert including a number of two-part cavities formed therein and open to a first insert surface, each of the two-part cavities having a first cavity open to the first insert surface having a first diameter less than a diameter of a battery to be inserted therein and a depth greater than one-half a length of the battery to be inserted therein and a second cavity concentrically oriented with the first cavity and in connection with the first cavity, the second cavity having a second diameter at least one-quarter inch less than the first diameter and a depth greater than a positive pole protrusion of the battery to be inserted therein, the first molded foam insert being constructed from a resilient foam of sufficient resilience to allow the walls defining the first cavity to stretch for receiving a battery and resiliently gripping and holding sidewalls of the battery; the second molded foam insert having a corresponding number of one-part cavities formed therein wherein one one-part cavity of the second molded foam insert is concentrically oriented with one of the two-part cavities of the first molded foam insert; each of the one-part cavities having a diameter greater than the first diameter of the corresponding two-part cavity and a depth selected to prevent a negative pole of a battery intended to be inserted into the corresponding two-part cavity from contacting a bottom surface of the one-part cavity.

Accordingly, a battery storage system is provided. The battery storage system includes a two-part hinged carrying case having a first and a second part; a first molded foam insert formed from electrically non-conductive resilient foam and positioned within the first part of the two-part hinged carrying case; a second molded foam insert formed from electrically non-conductive resilient foam and positioned within the second part of the two-part hinged carrying case; first and second handle portions secured, respectively, to the first and second parts of the two-part hinged carrying case; two hinge assemblies connected between the first and second two-part hinged carrying case; and two sets of securing hasps secured to the two-part hinged carrying case such that the first and second parts are securable together with the two sets of securing hasps when the first and second parts of the two-part hinged carrying case are folded into a closed configuration; the first molded foam insert including a number of two-part cavities formed therein and open to a first insert surface, each of the two-part cavities having a first cavity open to the first insert surface having a first diameter less than a diameter of a battery to be inserted therein and a depth greater than one-half a length of the battery to be inserted therein and a second cavity concentrically oriented with the first cavity and in connection with the first cavity, the second cavity having a second diameter at least one-quarter inch less than the first diameter and a depth greater than a positive pole protrusion of the battery to be inserted therein, the first molded foam insert being constructed from a resilient foam of sufficient resilience to allow the walls defining the first cavity to stretch for receiving a battery and resiliently gripping and holding sidewalls of the battery; the second molded foam insert having a corresponding number of one-part cavities formed therein wherein one one-part cavity of the second molded foam insert is concentrically oriented with one of the two-part cavities of the first molded foam insert; each of the one-part cavities having a diameter greater than the first diameter of the corresponding two-part cavity and a depth selected to prevent a negative pole of a battery intended to be inserted into the corresponding two-part cavity from contacting a bottom surface of the one-part cavity.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 2 is a plan view showing the two-part hinged carrying case in the open configuration showing the first molded foam insert formed from electrically non-conductive resilient foam and positioned within the first part of the two-part hinged carrying case; the second molded foam insert formed from electrically non-conductive resilient foam and positioned within the second part of the two-part hinged carrying case; the first and second handle portions secured, respectively, to the first and second parts of the two-part hinged carrying case; the two hinge assemblies connected between the first and second two-part hinged carrying case; and the two sets of securing hasps secured to the two-part hinged carrying case such that the first and second parts are securable together with the two sets of securing hasps when the first and second parts of the two-part hinged carrying case are folded into a closed configuration; the first molded foam insert including a number of two-part cavities formed therein and open to a first insert surface, each of the two-part cavities having a first cavity open to the first insert surface having a first diameter less than a diameter of a battery to be inserted therein and a depth greater than one-half a length of the battery to be inserted therein and a second cavity concentrically oriented with the first cavity and in connection with the first cavity, the second cavity having a second diameter at least one-quarter inch less than the first diameter and a depth greater than a positive pole protrusion of the battery to be inserted therein, the first molded foam insert being constructed from a resilient foam of sufficient resilience to allow the walls defining the first cavity to stretch for receiving a battery and resiliently gripping and holding sidewalls of the battery; the second molded foam insert having a corresponding number of one-part cavities formed therein wherein one one-part cavity of the second molded foam insert is concentrically oriented with one of the two-part cavities of the first molded foam insert; each of the one-part cavities having a diameter greater than the first diameter of the corresponding two-part cavity and a depth selected to prevent a negative pole of a battery intended to be inserted into the corresponding two-part cavity from contactinga bottom surface of the one-part cavity.

EXEMPLARY MODE FOR CARRYING OUT THE INVENTION

Figure 1:
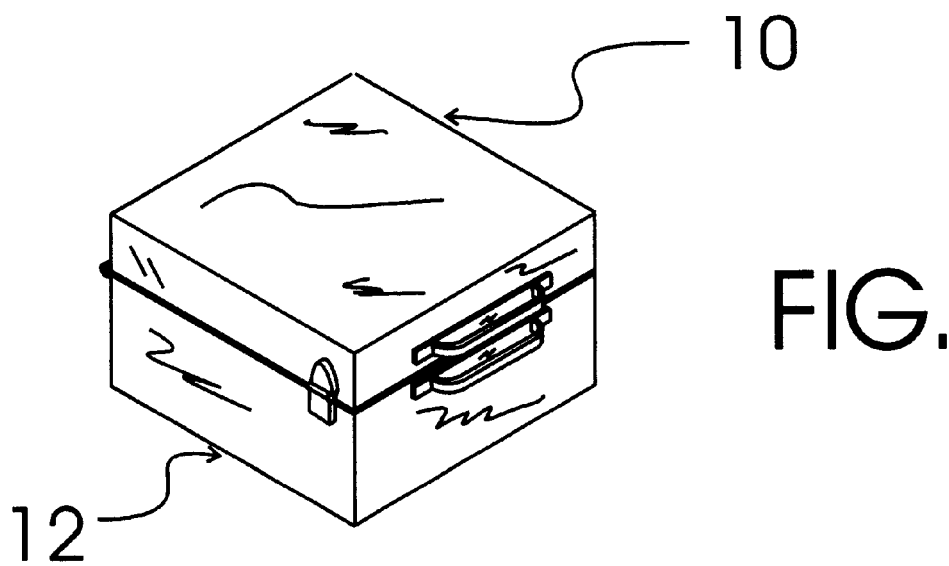
FIG. 1 is perspective view of an exemplary embodiment of the battery storage system of the present invention showing the hasp closeable, two-part, hinged carrying case in the closed and secured configuration.

FIG. 1 shows an exemplary embodiment of the battery storage system of the present invention, generally designated 10, showing the hasp closeable, two-part hinged carrying case, generally designated 12, in the closed and secured configuration.

Figure 3:
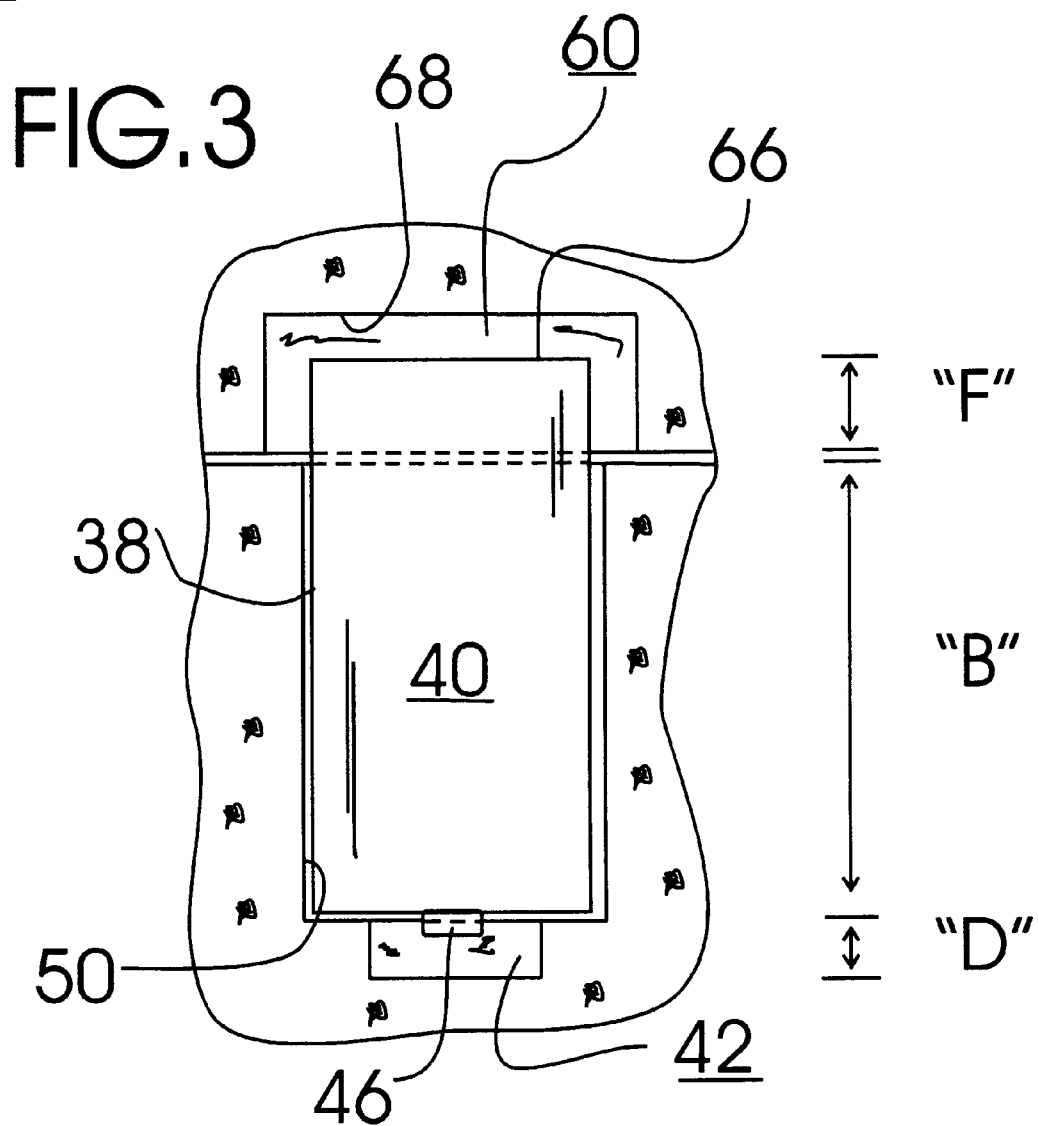
FIG. 3 is a cross section view showing a representative battery with the sides of the battery held by the wall defining the first cavity of two-part cavity, the positive pole protrusion of the battery positioned within second cavity of two-part cavity without touching any of the defining walls of second cavity, and the negative end of the battery positioned within one-part cavity without touching any of the defining walls of the one-part cavity; the battery being electrically isolated from both the first and second molded inserts to prevent leakage currents from draining the battery during storage periods.

With reference now to FIGS. 2 and 3, two-part hinged carrying case 12 includes a first part 14 and a second part 16 hingedly connected in a suitcase fashion with hinges 18 and lockable in a closed position (FIG. 1) with two sets of hasps 20. A handle 24 is secured to each of first and second parts 14,16 for ease in carrying. A first molded foam insert 30 formed from electrically non-conductive resilient foam is positioned within first part 14 of two-part hinged carrying case 12. A second molded foam insert 32 formed from electrically non-conductive resilient foam is positioned within second part 16 of two-part hinged carrying case 12.

First molded foam insert 30 includes eighteen two-part cavities 34 formed therein and that are open to a first insert surface. In this embodiment the eighteen two-part cavities are adapted to hold three D-cells, four C-cells, five AA-cells, four AAA-cells, and two nine volt cells. Each of the two-part cavities 34 has a first cavity 38 open to the first insert surface and of a first diameter "A" less than the diameter of the type of battery to be inserted therein and a depth "B" (FIG. 3) greater than one-half a length of the battery 40 to be inserted therein and a second cavity 42 concentrically oriented with first cavity 38 and in connection with first cavity 38. Second cavity 42 has a second diameter "C" at least one-quarter inch less than first diameter "A" and a depth "D" greater than a positive pole protrusion 46 (FIG. 3) of the battery 40 to be inserted therein. First molded foam insert 30 is constructed from a resilient foam of sufficient resilience to allow the wall 50 defining first cavity 38 to stretch for receiving battery 40 and resiliently gripping and holding sidewalls of the battery 40.

Second molded foam insert 32 has eighteen one-part cavities 60 formed therein wherein one one-part cavity 60 of second molded foam insert 34 is concentrically oriented with one of the two-part cavities 34 of first molded foam insert 30. Each of the one-part cavities 60 has a diameter "E" greater than the first diameter "A" of the corresponding two-part cavity 34 and a depth "F" selected to prevent a negative pole 66 of battery 40 from contacting a bottom surface 68 of one-part cavity 60. When battery 40 is held in this configuration, discharge currents can not be established to drain the battery 40.

It can be seen from the preceding description that a battery storage system has been provided that includes a two-part hinged carrying case having a first and a second part; a first molded foam insert formed from electrically non-conductive resilient foam and positioned within the first part of the two-part hinged carrying case; a second molded foam insert formed from electrically non-conductive resilient foam and positioned within the second part of the two-part hinged carrying case; first and second handle portions secured, respectively, to the first and second parts of the two-part hinged carrying case; two hinge assemblies connected between the first and second two-part hinged carrying case; and two sets of securing hasps secured to the two-part hinged carrying case such that the first and second parts are securable together with the two sets of securing hasps when the first and second parts of the two-part hinged carrying case are folded into a closed configuration; the first molded foam insert including a number of two-part cavities formed therein and open to a first insert surface, each of the two-part cavities having a first cavity open to the first insert surface having a first diameter less than a diameter of a battery to be inserted therein and a depth greater than one-half a length of the battery to be inserted therein and a second cavity concentrically oriented with the first cavity and in connection with the first cavity, the second cavity having a second diameter at least one-quarter inch less than the first diameter and a depth greater than a positive pole protrusion of the battery to be inserted therein, the first molded foam insert being constructed from a resilient foam of sufficient resilience to allow the walls defining the first cavity to stretch for receiving a battery and resiliently gripping and holding sidewalls of the battery; the second molded foam insert having a corresponding number of one-part cavities formed therein wherein one one-part cavity of the second molded foam insert is concentrically oriented with one of the two-part cavities of the first molded foam insert; each of the one-part cavities having a diameter greater than the first diameter of the corresponding two-part cavity and a depth selected to prevent a negative pole of a battery intended to be inserted into the corresponding two-part cavity from contacting a bottom surface of the one-part cavity.

It is noted that the embodiment of the battery storage system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A battery storage system comprising:

a two-part hinged carrying case having a first and a second part;

a first molded foam insert formed from electrically non-conductive resilient foam and positioned within said first part of said two-part hinged carrying case;

a second molded foam insert formed from electrically non-conductive resilient foam and positioned within said second part of said two-part hinged carrying case;

two hinge assemblies connected between said first and second two-part hinged carrying case; and two sets of securing hasps secured to said two-part hinged carrying case such that said first and second parts are securable together with said two sets of securing hasps when said first and second parts of said two-part hinged carrying case are folded into a closed configuration;

said first molded foam insert including a number of two-part cavities formed therein and open to a first insert surface, each of said two-part cavities having a first cavity open to said first insert surface having a first diameter less than a diameter of a battery to be inserted therein and a depth greater than one-half a length of said battery to be inserted therein and a second cavity concentrically oriented with said first cavity and in connection with said first cavity, said second cavity having a second diameter at least one-quarter inch less than said first diameter and a depth greater than a positive pole protrusion of said battery to be inserted therein, said first molded foam insert being constructed from a resilient foam of sufficient resilience to allow said walls defining said first cavity to stretch for receiving a battery and resiliently gripping and holding sidewalls of the battery;

said second molded foam insert having a corresponding number of one-part cavities formed therein wherein one one-part cavity of said second molded foam insert is concentrically oriented with one of said two-part cavities of said first molded foam insert;

each of said one-part cavities having a diameter greater than said first diameter of said corresponding two-part cavity and a depth selected to prevent a negative pole of a battery intended to be inserted into said corresponding two-part cavity from contacting a bottom surface of said one-part cavity.

* * * * *